United States Patent [19]
Curtis et al.

[11] 3,776,539
[45] Dec. 4, 1973

[54] PLASTIC PIPE BENDING JIG

[76] Inventors: John S. Curtis, 3659 Cummings Rd., Cleveland Heights, Ohio 44118; Lee A. Miller, 15104 Hill Dr., Novelty, Ohio 44072

[22] Filed: May 19, 1971

[21] Appl. No.: 144,817

[52] U.S. Cl. .................. 269/81, 65/281, 269/45, 269/104, 269/152, 425/392
[51] Int. Cl. .................. B29g 7/00, B23q 3/06
[58] Field of Search ............... 269/37, 45, 97, 104, 269/105, 106, 126, 152, 154, 156, 41, 81, 107, 127, 155; 65/272, 281, 292; 425/392; 72/369, 310

[56] References Cited
UNITED STATES PATENTS

| | | | |
|---|---|---|---|
| 783,031 | 2/1905 | Fell | 269/45 |
| 2,803,872 | 8/1957 | Massa | 269/37 |
| 2,936,803 | 5/1960 | Jorick | 269/45 |
| 3,065,550 | 11/1962 | Pattiani | 269/45 X |
| 1,323,127 | 11/1919 | Treuthardt | 269/81 X |
| 2,311,042 | 2/1943 | Ferguson | 269/81 X |
| 2,679,178 | 5/1954 | Odin | 269/104 X |
| 2,941,557 | 6/1960 | Baprawski | 269/41 |
| 3,394,389 | 7/1968 | Amir | 269/155 X |

*Primary Examiner*—Robert L. Spruill
*Attorney*—Oberlin, Maky, Donnelly & Renner

[57] ABSTRACT

A plastic pipe bending jig for establishing bend curvature and configuration having a plurality of operatively interconnected arms, pipe receiving clamps connected to the radial extremities of such arms, such clamps being radially and angularly adjustable to the desired radius and angle of curvature for the pipe, and indicia associated with the jig for determining such radial and angular displacement of the clamps. The jig is used by adjusting the clamps to define the desired pipe configuration, heating the pipe until pliable and placing the same in the clamps until hardened.

10 Claims, 9 Drawing Figures

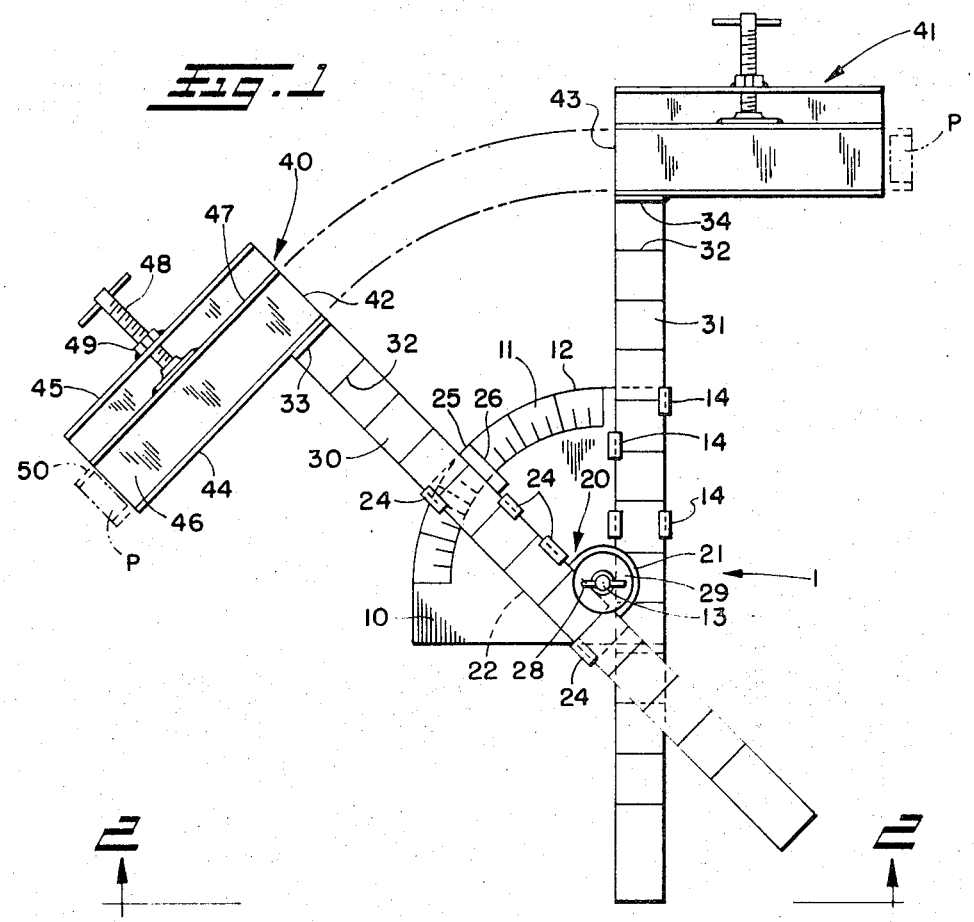
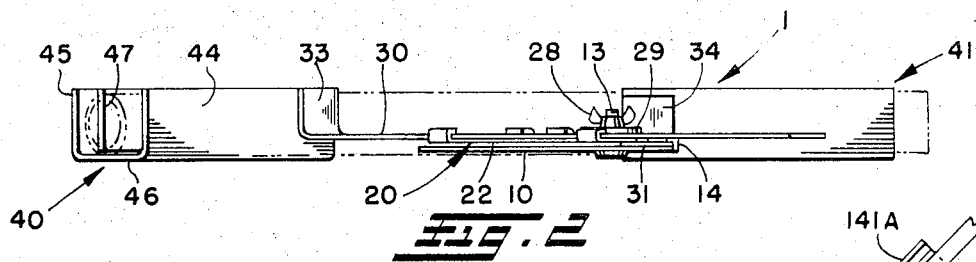
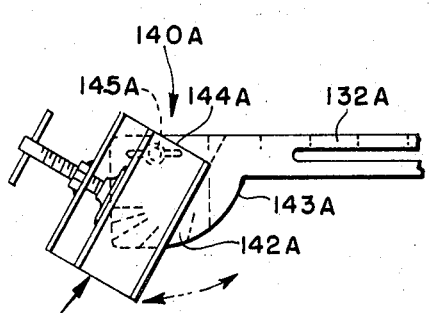
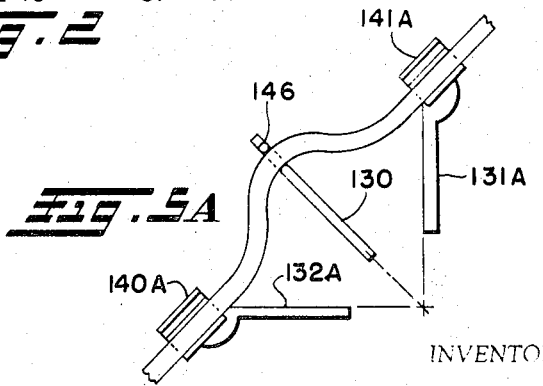

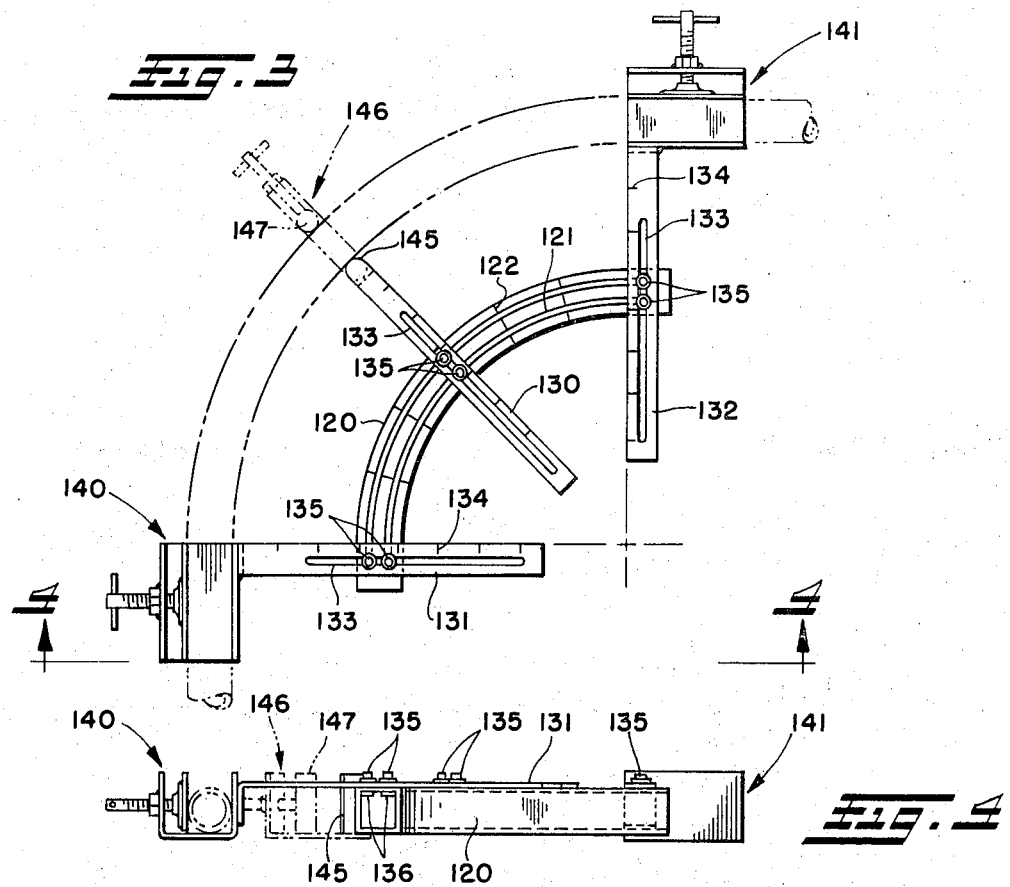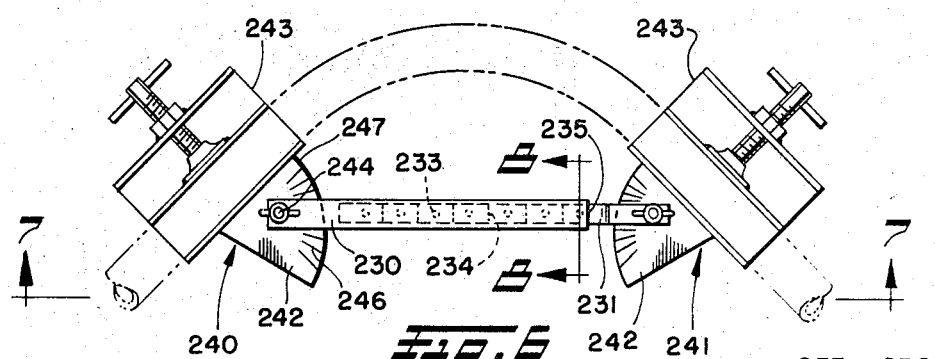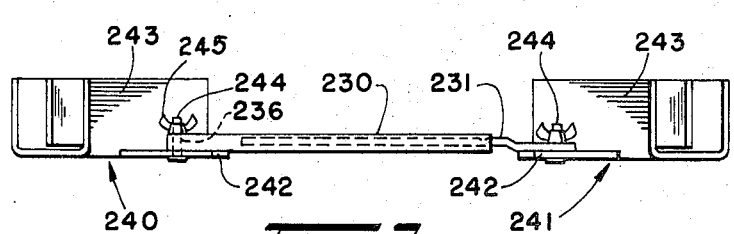

PLASTIC PIPE BENDING JIG

The present invention relates as indicated to a plastic pipe bending jig and more particularly to a jig which may be used with pipes of varying diameter to produce any given curvature or configuration in such pipe.

Field bending of plastic pipe to given configurations is primarily accomplished by one of two methods, namely, the use of large templates or line of sight judgment. Both of such methods have disadvantages which mitigate against their successful use in field applications.

The templates in order to be adaptable to as many bending operations as possible have a plurality of lines scored on the faces thereof to act as guides in the bending of the plastic pipe. The use of such a large number of guidelines necessarily requires extensive surface area to accommodate the same. Thus, the template is normally of relatively large size whereby it may not be readily transported or stored. Additionally, no matter how many guidelines are proliferated on the surface of the template, it is impossible to provide for every possible curvature or configuration that may be desired. Therefore, when an appropriate guideline is not found on the template, it is necessary to bend the pipe relying upon line of sight judgment which suffers from the disadvantages discussed immediately hereinafter.

The primary disadvantage of bending plastic pipe using only line of sight judgment is the lack of bend accuracy. Without such accuracy, the bend radius, the segment of circle described by the bend, and the relative horizontal and vertical positioning of the pipe sections tangentially connected to the extremities of the curve cannot be controlled or readily determined which results in problems of field assembly. If the dimensional variances are too great, it may require the rebending of such pipe or the use of another pipe bent to the desired configuration.

Accordingly, it is the primary object of the present invention to provide a pipe jig which can be used to bend plastic pipe of various diameters accurately.

It is another important object of the present invention to provide a plastic pipe bending jig which is adjustable so as to form the curvature and configuration of bends having various radii and number of degrees of turn in the curve segment.

It is another important object of the present invention to provide a pipe bending jig which may be arranged to bend pipe to given irregular configurations.

Another object of the present invention is to provide a structurally strong and accurate pipe jig which is lightweight for easy transport thereof and relatively small in size for easy storage.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In the drawings:

FIG. 1 is a top plan showing one form of the pipe bending jig, with the pipe bent thereby shown in phantom;

FIG. 2 is a front elevation of the pipe jig of FIG. 1 as indicated by line 2-2 in the latter;

FIG. 3 is a top plan of another embodiment of a plastic pipe bending jig according to the present invention; with the pipe bent thereby and an additional arm with a center pipe clamp shown in phantom;

FIG. 4 is a front elevation of the pipe jig of FIG. 3 as indicated by line 4-4 in the latter;

FIG. 5 is a bottom plan of a modification of the outer clamp assembly construction shown in FIG. 3;

FIG. 5A is a schematic top plan of the embodiment of FIG. 3 having the modified outer clamp assembly of FIG. 5 thereon, with the pipe illustrated;

FIG. 6 is a top plan of still another embodiment of the pipe jig according to the present invention, with the pipe bent thereby shown in phantom;

FIG. 7 is a front elevation of the pipe jig of FIG. 6 as indicated by line 7—7 in the latter; and FIG. 8 is an enlarged vertical cross section of the telescoping arms of FIG. 6, taken along the plane of line 8—8 in FIG. 6.

Referring now in more detail to the drawings and initially to FIGS. 1 and 2, a plastic pipe bending jig, indicated geneally at 1, is illustrated which includes a base member 10, an arm bracket 20, two arms 30 and 31 and two clamps 40 and 41. For purposes of illustration, the pipe 50 shown in phantom is bent so as to form a 45° elbow, however, it will be clear as the following description proceeds that a wide range of elbow angularities and radii of curvature is possible with the jig of the present invention.

The base plate or member 10 is a relatively thin quadrant having a protractor 11 etched or die scored thereon adjacent arcuate surface 12. Although the protractor shown is of only 90° in extent with 5° increments, it is obvious that if more accuracy were desired, a greater number of increments could be used, or if a greater range was desired, a differently shaped base member with, for example, a 180° protractor etched thereon could be used. The base plate has an aperture therein through which an upwardly extending stud 13 is disposed, such stud being affixed to the bottom surface of the base plate 10 as shown in FIG. 2. One side of the plate 10 has a plurality of upstanding and rebent tabs 14 for receiving arm 31 therein, such arm being radially slidably adjustable, the tabs 14 providing sufficient frictional resistance to assist in maintaining the arm in its position of adjustment.

Arm bracket 20 is an integrally formed plate having an essentially semi-circular projecting shoulder 21 and an elongated rectangular section 22. The shoulder 21 has a centrally located aperture which is adapted to receive stud 13, with the bottom surface of such shoulder bearing against the upper surface of arm 31. The lateral edges of elongated rectangular section 22 are provided with a plurality of upstanding and rebent tabs 24, similar to the tabs 14, for receiving arm 30. Also, one edge of such section 22 is provided with an outwardly extending angle indication projection 25. The edge 26 of projection 25 is laterally offset from the edge of section 22 an amount which is equal to the distance that the center of aperture 23 is offset from the same edge in order to give an accurate indication of angularity about the pivot point of the arm bracket.

Arm 30 is horizontally received in tabs 24 for lineal radial sliding movement therein as described above in connection with arm 31. The arms are each of substantially equivalent length with indicia marks 32 of corresponding scale and position etched or die scored on their top surface. As in the case of the protrator, the number of marks used depends upon the accuracy desired and the range of the scale. The radial position of the arms may thus be readily determined by reading the number associated with the indicia mark which is in registry with or closest to the edge of the protractor 12, which edge is of known radius.

The radial extremities of arms 30 and 31 are perpendicularly bent with respect to the rest of the arm as at 33 and 34, respectively, to present an external face to which clamps 40 and 41 defining straight elongated guides are welded or otherwise suitably connected. Such clamps are positioned so that their pipe supporting surfaces will be disposed in the same horizontal plane. This requires that the clamp 40 be placed relatively lower on the external face of portion 33 than clamp 41 is placed on the external face of 34 since arms 30 and 31 are slightly vertically offset, as best shown in FIG. 2. In addition, the clamps are positioned so that the opposed inner edges 42 and 43 thereof establish the points where the curve begins and the clamping section defines a tangent to such curve.

Since clamps 40 and 41 are identically constructed, only clamp 40 will be described in detail. Such clamp includes a generally U-shape hollow frame section having inner wall 44, outer wall 45 and bottom pipe supporting wall 46. Disposed between walls 44 and 45 is a vertically oriented, laterally adjustable pressure plate 47 which bears against the outer surface of the pipe inserted in the clamp. Such pressure plate is laterally adjusted in a well known manner by swivel bolt 48 which at its end is operatively connected to such plate and at an intermediate portion is threaded through nut 49, the bore of which is in alignment with an aperture in wall 45. Thus, by adjusting the lateral position of the pressure plate 47, plastic pipes of varying diameter may be received in the clamp.

The above described jig device is set up for bending a plastic pipe to a given angular extent of curvature and radius in the following manner. Initially, each arm is radially adjusted until corresponding marks 32 on each arm in registry with a common reference point such as the edge of the protractor. Secondly, the arm bracket 20 and thus arm 30 connected thereto are pivoted about stud 12 until edge 26 is in alignment with the indicia for the given angle. Finally, wing nut 28 is drawn downwardly until the bottom surface thereof bears against the top surface of friction washer 29 which in turn bears against arm 31 and shoulder 21, the latter bearing against arm 31, thereby locking the bracket and arms in the desired position. The washer may be rigid and stepped or flexible properly to bear against the subjacent surfaces.

The pressure plates are then adjusted to provide the correct spacing to accept the pipe. After the jig is set up in the manner defined above, the pipe 50 is heated until it becomes pliable and can be bent for insertion into clamps 40 and 41. The pipe is allowed to cool while thus held until it hardens. The cooling may be accelerated by sponging or spraying with water. The pipe thus bent is then removed.

For certain pipe or tube sizes, the walls may tend to buckle or collapse if the curvature is too severe. This can usually be avoided by plugging the pipe ends, as indicated at P, prior to heating. Sufficient air pressure is built up inside the pipe during the heating thereof to preclude such buckling.

Although the above-described use of the jig for bending pipe was specifically directed to the device of FIGS. 1 and 2, the same general steps are followed in using the other jig embodiments set forth hereinafter. The particular manner of adjusting radius and extent of curvature should become clear from the structural description of such other forms of the device. Therefore, an operational or method definition as given above will not be repeated for every alternative modification discussed.

Referring now to FIGS. 3 and 4, a second embodiment of the present invention is shown having an arcuate base member 120 and arms 130, 131 and 132. The base member 120 comprises an open ended, hollow rectangular frame section having the top surface thereof provided with two elongated, parallel, arcuate slots commonly designated at 121 which define between the ends thereof an arc of 90°. The top surface of member 120 has etched or die scored thereon radially directed marks 122 having a numerical scale associated therewith to indicate angularity of arms 130, 131 and 132.

Such arms are each provided with both elongated longitudinal slots commonly designated 133 and transverse indicia markings 134. Bolts 135 pass through the portions of slots 133 and 121 which are in alignment, such bolts having nuts 136 threaded thereon to attach the arms to the base member. When the nuts are tightly drawn against such base member, it is obvious that the angular and radial position of the arms are fixed. However, when the nut is not tightly drawn up to the base member, the arms 130, 131 and 132 may be both angularly and radially adjusted to the extent of slots 121 and 133, respectively.

Arms 131 and 132 have clamps 140 and 141 welded or otherwise suitably connected to the radial extremities thereof, such clamps being of the same construction as that previously discussed. Arm 130 has a guide assembly at the radial extremity thereof to aid in the formation of a smooth elbow curve. As illustrated, the guide assembly comprises a downwardly extending cylindrical member 145 which is adapted tangentially to engage the radially inner wall of the plastic pipe. A similar guide assembly or assemblies may be provided in the other illustrated embodiments.

However, if it is desired to maintain a slight clamping pressure at such intermediate point to substantially ensure that the bend will be maintained in the same horizontal plane, a clamping assembly as illustrated in phantom at 146 may be provided. Such a clamping assembly would be similar to the clamps described hereinabove, but rather than having a transversely moving pressure plate it has a cylindrically formed transversely moving pressure member 147. The cylindrical shape of members 145 and 147 allow either guidance or pressure application to the pipe 150 without interrupting curvature regularity since such pipe is contacted only at points of tangency to the arc.

By having an arcuate base member, it is possible to describe a larger radius of bend curvature with shorter arms than is possible if such arms are pivoted about the actual center point. Thus in the most commonly used radii for plastic pipe bends or elbows of from 12 to 48 inches, the respective arms need be only slightly longer than three feet with a base member radius of approximately a foot.

The shorter arms in conjunction with support radially outwardly of the center point reduces flexure in the arm members so that there will be very little vertical variance as between the respective clamp members. It is also apparent that if smaller radii bends were desired, one may disconnect the respective arms from the base member, reverse the same by rotating the arm through 180° arc and reconnect the arms to the base member. Inverting the arms or substituting one for the other will enable the clamps to hold the linear plastic pipe tangentially to the extremities of the curved segment.

Referring now to FIG. 5, a modified, pivotable clamp assembly 140A to be used in conjunction with the pipe jig of FIGS. 3 and 4 is illustrated having the previously described clamp 140 on the underside and pivotally mounted to the bottom surface of quadrant 142A integrally formed with the arm 132A. The quadrant has a protractor etched or die scored upon the upper surface thereof adjacent arcuate surface 143A, whereby the angularity of the clamp 140A may be determined by reading the angle indicated by the numerical indicia associated with the marking in alignment with inside surface 144A of the clamp. The wing nut 145A disposed on top of quadrant 142A on the connective stud allows the clamp to be pivoted when loose and locks the clamp in a given angular position when tight.

As best shown in FIG. 5A, the pivotability of the clamp members allows the plastic pipe to be formed into more complex configurations, such as the reverse curve illustrated. In the schematic, clamps 140A and 141A are linearly aligned by rotation of such clamps through an angle of 45°. Depending upon the vertical height desired for the apex of the U-shape bend, the radial position of arm 130 is set accordingly. The configuration defined by the three clamp members 140A, 141A and 146 thus varies from the simple 90° elbow shown in FIG. 3. As is readily apparent from the schematic view, any number of configurations is possible depending upon the radial and angular positioning of the three arms and clamps. Further pipe configurations are possible by adding a greater degree of angular freedom for both the arms and clamps as well as by adding a greater number of arms.

Pivotal clamp assemblies may also be employed upon arms 30 and 31 in FIG. 1. This would allow the operator of the jig to form plastic pipes into configurations other than elbows.

Referring now to FIGS. 6, 7 and 8, a third embodiment of the present invention is illustrated which has two linearly telescoping arms 230 and 231 having clamp assemblies 240 and 241 pivotally connected to the radial extremities thereof. The arm 230 is of hollow rectangular construction as shown in FIGS. 7 and 8 and is provided with at least one detent 232 in the top surface thereof. Such detent receptively cooperates with vertical holes 233 in arm 231, such holes being longitudinally equally spaced in convenient dimensional increments. When the detent is received in a hole 233 as shown in FIG. 8, the arms are locked against further linear movement, unless a releasing force is applied thereto. The relative linear displacement between the two clamping assemblies is indicated by transversely extending indicia marks 234 on arm 231, which are read when they are in alignment with the end surface 235 of arm 230.

Although the telescoping arms are illustrated as being rectangular in cross-section, it is obvious that other structural forms could also be suitable employed. For example, the arms could be tubular or for that matter of flat bar stock. Additionally, other forms of locking the arms in a fixed telescopic relationship could be used. For example, in the present construction, locking screws disposed in longitudinally spaced holes in arm 230 could be used with such locking screws being adapted to bear against the surface of arm 231 when tightened to lock the same in its linear position.

Moreover, the concept of two arms confined to relative linear movement with pivotal clamps attached to the radial extremities thereof could be accomplished by methods other than the telescopic relationship previously discussed. For example, a turnbuckle could be employed between the two arms to vary the radial positioning of the same.

Each of the clamp assemblies 240 and 241 comprise a fan-shaped member 242 having a clamp 243 welded or otherwise suitably connected to the top surface thereof. The fan-shaped base member has upwardly extending stud 244 welded thereto, such stud in the assembled condition of the jig passing through an aperture 236 in the radial extremities of the arms. A wing nut 245 is threadably received on stud 244 to lock the clamp assembly 240 in a fixed position when tightly drawn down upon the arm with which it is associated or to allow pivotal movement of such clamping assembly when loosely associated with such arm.

The top surface of fan-shape member 242 has a protractor scale 246 etched or die-scored thereupon adjacent the arcuate surface 247. The angular position of the clamp is determined by reading the numerical figure associated with the line in alignment with the side edge of the arm 230. As shown by the phantom lines in FIG. 6, when the clamp assemblies are pivoted so that the clamp 243 is inclined at a 45° angle with respect to the arms, a 90° bend is formed in the plastic pipe received by such clamps.

It is obvious that other methods may be employed to vary the relative radial and angular positioning of the pipe receiving and holding clamps. For example, a three bar triangular linkage with clamps connected to the pivotal intersections thereof could be employed which would simultaneously vary the radial and angular positioning of such clamps.

Other modes of applying the principle of the invention may be employed, change being made as regards the details described, provided the features stated in any of the following claims, or the equivalent of such be employed.

The embodiments of the invention in which an exclusive property or privilege is claimed are defined as follows:

1. A jig positionable on a flat support surface to facilitate the bending of heat softenable plastic pipe to a given curvature over a curved section heated to the softening temperature of said pipe and having curved section ends comprising interconnected spaced-apart straight elongated guides positionable on said support surface to hold said pipe at and beyond said curved section ends with said curved section supported on said support surface between said guides until said curved section cools to the hardening temperature of said pipe so that said guides establish tangential straight segments of said pipe beyond said curved section ends with said straight segments being tangent to said curved section at said curved section ends, a pair of elongated support arms having outer arm ends, said arms being attached to support means, said guides being attached to said outer arm ends, radial adjustment means for radially adjusting said arms relative to said support means, at least one of said arms being angularly adjustable relative to said support means for angular movement toward and away from the other of said arms, and at least one of said guides attached to one of said arm ends being angularly adjustable about a substantially vertical axis relative to said one arm end.

2. The jig of claim 1 wherein said guides include inner and outer walls, said inner walls being adjustably movable relative to said arm ends and toward and away from said inner walls to vary the space therebetween for accommodating pipe of varying diameters, said inner walls being fixed relative to said arm ends so that said inner walls maintain predetermined radii from said radial adjustment means regardless of the radial adjusted position of said arms and regardless of the adjusted position of said outer walls.

3. A jig to facilitate the bending of plastic pipe to a given curvature comprising straight elongated guides to hold said pipe beyond the ends of such curvature to establish tangential straight segments of the pipe at the extremities of such given curvature, support means interconnecting said guides, said support means including means to vary the angular relationship between said guides, said support means including at least two arms operatively interconnected having said guides connected to the outer extremities thereof, said support means further including a base member to which said arms are connected, said base member being in the form of a protractor, and indicia means thereon to measure the angle between said arms.

4. The jig as set forth in claim 3 including indicia means on said arms to measure the radial position of said arms with respect to said base.

5. A jig to facilitate the bending of plastic pipe to a given curvature comprising straight elongated guides to hold said pipe beyond the ends of such curvature to establish tangential straight segments of the pipe at the extremeties of such given curvature, support means interconnecting said guides, said support means including means to vary the angular relationship between said guides, said support means including at least two arms operatively interconnected having said guides connected to the outer extremities thereof, said support means further including a base member to which said arms are connected, one of said arms being connected to said base member to have only a radial degree of freedom, and the other of said arms being connected to said base member to have both angular and radial degrees of freedom.

6. A jig as set forth in claim 5 wherein said base member comprises folded tabs to receive said one arm, and a plate superimposed upon and pivoted to said base member, said plate having folded tabs to receive said other arm.

7. A jig as set forth in claim 6 including a stud pivotally joining said base and plate having a nut thereon which when drawn down locks said plate, other arm and one arm against movement.

8. A jig as set forth in claim 7 including means beneath said nut properly to distribute the force thereof to subjacent surfaces.

9. A jig to facilitate the bending of plastic pipe to a given curvature comprising straight elongated guides to hold said pipe beyond the ends of such curvature to establish tangential straight segments of the pipe at the extremities of such given curvature, support means interconnecting said guides, said support means including means to vary the angular relationship between said guides, said support means including at least two arms operatively interconnected having said guides connected to the outer extremities thereof, said arms having a slot along the major axis thereof, an arcuate base member having at least one arcuate slot therein, said arms being joined to said base member by connection means disposed within said arm and base member slots at their points of intersection.

10. A jig as set forth in claim 9 including a radially and angularly adjustable third arm connected to said base member, said third arm having a pipe bend guide on the outer end therof.

* * * * *